No. 755,632. Patented March 29, 1904.

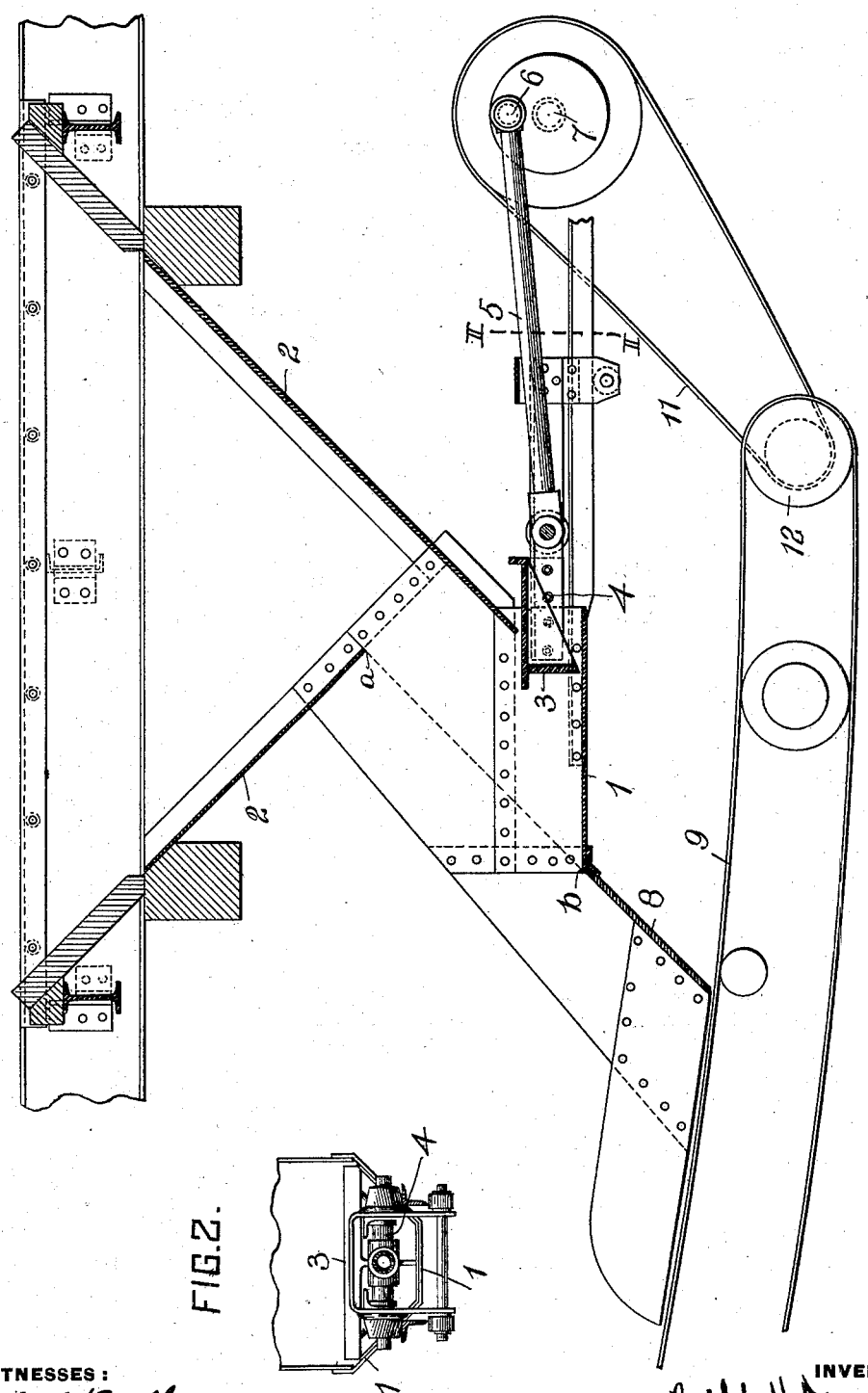

UNITED STATES PATENT OFFICE.

RALPH H. DEMPCY, OF PITTSBURG, PENNSYLVANIA, ASSIGNOR TO TATE JONES & CO., INCORPORATED, OF PITTSBURG, PENNSYLVANIA, A CORPORATION OF NEW JERSEY.

MECHANISM FOR FEEDING.

SPECIFICATION forming part of Letters Patent No. 755,632, dated March 29, 1904.

Application filed November 19, 1902. Serial No. 131,925. (No model.)

*To all whom it may concern:*

Be it known that I, RALPH H. DEMPCY, a citizen of the United States, residing at Pittsburg, in the county of Allegheny and State of Pennsylvania, have invented or discovered certain new and useful Improvements in Mechanism for Feeding Materials, of which improvements the following is a specification.

The invention described herein relates to certain improvements in mechanism for effecting a regular feed of material, such as coal, from a hopper or other receptacle, the invention being more especially applicable for use in plants where a conveyer, either with or without buckets, is employed for effecting the movement of the coal from one point to another.

The invention is hereinafter more fully described and claimed.

In the accompanying drawings, forming a part of this specification, Figure 1 is a sectional elevation of a portion of a plant embodying a hopper and a conveyer-belt having my improved mechanism applied thereto. Fig. 2 is a sectional view on a plane indicated by the line II II, Fig. 1.

In the practice of my invention I provide a platform 1, preferably suspended from the storage-hopper 2 in any suitable manner and so located with reference to the discharge-opening from said hopper that the discharge edge of said platform will extend to and preferably beyond the point of intersection of a plane with the platform, said plane extending from the upper edge of the discharge-opening of the hopper and forming with the platform an angle equal to the angle of rest of the material being fed. In other words, a plane coinciding with the edge *a* of one side of the discharge-opening from the hopper 2 and arranged at an angle to the platform 1, corresponding to the angle of rest of the material, should intersect the platform at or within the discharge edge *b* of said platform, so that no material passing from the hopper on the platform will flow off of the latter except as shifted by a plunger. This plunger or pushing-head is constructed in any suitable manner and preferably consists of a casting 3, secured to a frame 4, which is connected by a pitman 5 to a crank-pin 6 on a shaft 7. By the movement of this crank-pin the pushing-head is caused to move back and forth along the platform 1 and force off a certain quantity of material resting thereon dependent upon the height of the head from the platform and the width of the head and platform. As shown, the upper face of the pushing-head is made plain or even, so that as it moves forward to push material from the platform it affords a support for the coal or other material above its path of movement. In order that none of the material may pass off the rear edge of the platform, one wall of the hopper 2 extends down to or nearly to the movable head and forms in connection therewith a rear wall for the hopper and discharge-platform. During each rearward movement of the pushing-head a certain amount of the material will drop down onto the platform 1; but as the discharge edge of the platform is beyond the angle of rest of the material none of the latter will drop off the platform, so that the amount of material fed will always be dependent upon the rate of movement of the pushing-head, the vertical and horizontal dimensions of the head and platform being the same. As shown in the drawings, the material is directed by a chute 8 down onto a conveyer-belt 9, passing around a driving-pulley 12 and extending to the desired point of discharge. This driving-pulley 9 is driven by a belt 11 from the shaft 7, carrying the crank-pin, so that the movement of the head and belt will always bear a certain relation to each other—as, for example, if the belt is carrying but a slight load it can be more easily and rapidly driven, and as the head reciprocates at a correspondingly-increased rate more material will be fed down onto the belt, thereby increasing its load and effecting a slowing down in its movement. As the load increases the belt will be slowed down and the feed mechanism will also be slowed down, so that by a proper regulating of the power and adjustment of the parts the belts may be made to carry at all times a uniform load.

I claim herein as my invention—

1. An apparatus for feeding material having in combination a receptacle having one or more sides sloping to a discharge-opening, a platform arranged to receive material from the receptacle and to check the movement of the material passing through the discharge-opening of the receptacle, and a reciprocating head for pushing material from the platform arranged to operate between the receptacle and the platform, substantially as set forth.

2. An apparatus for feeding material having in combination a receptacle, a stationary platform arranged below the discharge-opening of the hopper and extending beyond the edge of the discharge-opening a distance sufficient to prevent the material dropping off the platform in its movement from the hopper, and means for pushing the material from the platform, substantially as set forth.

3. In an apparatus for feeding material the combination of a receptacle, a platform arranged to receive the material passing through the discharge-opening of the receptacle and to check the free movement thereof, a reciprocating pusher, a conveyer to receive the material as it is pushed from the platform and means whereby the conveyer and pusher are controlled in their operation one by the other, substantially as set forth.

4. In an apparatus for feeding material, the combination of a receptacle, a platform arranged to receive material pressing through the discharge-opening of the receptacle, a reciprocating head for pushing the material from the platform, a conveyer arranged to receive the material from the platform, and means for controlling the conveyer and pushing-head the one by the other, substantially as set forth.

In testimony whereof I have hereunto set my hand.

RALPH H. DEMPCY.

Witnesses:
DARWIN S. WOLCOTT,
F. E. GAITHER.